(12) United States Patent
Smith

(10) Patent No.: US 6,338,649 B1
(45) Date of Patent: Jan. 15, 2002

(54) BATTERY CABLE DISCONNECTOR

(76) Inventor: Michael W. Smith, 10190 Buckhart Rd., Rochester, IL (US) 62563

( * ) Notice: Subject to any disclaimer, the term of this patent is extended or adjusted under 35 U.S.C. 154(b) by 0 days.

(21) Appl. No.: 09/800,983

(22) Filed: Mar. 7, 2001

Related U.S. Application Data

(60) Provisional application No. 60/188,963, filed on Mar. 10, 2000.

(51) Int. Cl.$^7$ ................................................. H01R 11/00
(52) U.S. Cl. ........................ 439/504; 439/369; 439/370; 411/552
(58) Field of Search ................................ 439/504, 345, 439/369, 370; 403/325, 348; 24/700, 701, 598.1; 411/552, 553

(56) References Cited

U.S. PATENT DOCUMENTS

| | | | | |
|---|---|---|---|---|
| 2,238,865 A | * | 4/1941 | Purinton ....................... | 24/221 |
| 2,457,593 A | | 12/1948 | Nelson ......................... | 287/76 |
| 3,564,563 A | * | 2/1971 | Trotter et al. ................. | 24/221 |
| 3,605,065 A | * | 9/1971 | Shannon ..................... | 339/28 R |
| 4,419,029 A | * | 12/1983 | Wenzel ....................... | 403/408 |
| 4,442,571 A | * | 4/1984 | Davis et al. ................. | 411/552 |
| 4,892,491 A | | 1/1990 | Budano et al. .............. | 439/582 |
| 5,018,993 A | | 5/1991 | Durham ....................... | 439/801 |
| 5,066,905 A | * | 11/1991 | Betton et al. ................ | 324/133 |
| 5,342,225 A | | 8/1994 | Farr ............................ | 439/817 |
| 5,688,093 A | * | 11/1997 | Bowers ....................... | 411/552 |
| 5,707,250 A | * | 1/1998 | Smithson .................... | 439/504 |

OTHER PUBLICATIONS

"Brass Battery Switch With Removable Knob" featured in the order–form insert of the Mid–Winter 2001 Herrington Catalog, 2001.

* cited by examiner

Primary Examiner—Tho D. Ta
Assistant Examiner—Ann McCamey
(74) Attorney, Agent, or Firm—Philip L. Bateman

(57) ABSTRACT

A battery cable disconnector enables a battery to be disconnected and reconnected quickly and easily without tools. The disconnector includes a female lug connector and a male lug connector adapted to be detachably connected together, each of the connectors having a two-faced contact section with one face for engagement with a face of the other connector when connected. The female contact section has an upper contact face and a lower non-contact face, the contact section having a centrally located circular opening with slots extending radially from the opening at the 12 and 6 o'clock positions and with grooves extending radially from the opening at the 3 and 9 o'clock positions on the lower non-contact face. The male connector contact section has a lower contact face and an upper non-contact face, the contact section having a centrally located circular opening with a hex head bolt extending therethrough, the bolt having a pin extending transversely through it at a point distal from the hex head and below the lower contact face, the pin being sized to fit through the slots in the female contact section, the bolt further having a surrounding helical spring above the upper non-contact face which yieldably urges the bolt away from the contact face.

5 Claims, 2 Drawing Sheets

BATTERY CABLE DISCONNECTOR

CROSS-REFERENCE TO RELATED APPLICATION

This application claims the benefit of U.S. Provisional Application Serial No. 60/188,963, filed Mar. 10, 2000.

FIELD OF THE INVENTION

This invention relates to battery cables for motor vehicles. More particularly, this invention relates to battery cable disconnectors.

BACKGROUND OF THE INVENTION

Modern motor vehicles contain electronic control systems that are easily damaged by electrical surges. To prevent such surges, it is advisable to disconnect the negative battery cable before performing any work on the vehicle's electrical system. Battery cables are typically connected to the battery terminals by means of bolted clamps. The removal and subsequent installation of battery cable clamps is a time-consuming operation that is performed many times each day by professional mechanics. It would be a tremendous time-saver to include a fast means for disconnecting and then reconnecting a battery cable without tools.

A variety of electrical connectors have been disclosed, including those shown in Nelson, U.S. Pat. No. 2,457,593, issued Dec. 28, 1948; Budano II et al., U.S. Pat. No. 4,892,491, issued Jan. 9, 1990; Durham, U.S. Pat. No. 5,018,993, issued May 28, 1991; and Farr, U.S. Pat. No. 5,342,225, issued Aug. 30, 1994. The Nelson connector features a pair of terminal devices provided with electrical contact elements having complementing faces adapted to be detachably connected together. The first element contains a slot and the second element contains an aperture registrable with a portion of the slot. The second element also contains a bolt and a spring that yieldably urges the bolt in a direction to pressurally maintain intimate electrical contact between the complemental faces of the elements. An alternate embodiment of the connector contains mating projections and recesses to reduce the risk of accidental disconnection. Nevertheless, the Nelson connector can be accidentally disconnected if it is bumped from the side.

Another type of electrical connector is sold by the Herrington mail order company of Londenberry, New Hampshire. The Herrington product is an anti-theft battery saver that fits directly onto a battery terminal. The product contains a knob that is loosened one-fourth turn to prevent battery drain and can be completely unscrewed to disable the vehicle and discourage thieves. A problem with such a product is that the knob can be misplaced or lost. Without the knob, it is very difficult to reconnect the cable and start the vehicle.

Accordingly, there is a demand for a product that would enable a battery cable to be quickly and easily disconnected and then reconnected without the use of tools.

SUMMARY OF THE INVENTION

The general object of this invention is to provide an improved battery cable disconnector. A more particular object is to provide a battery cable disconnector that can be quickly and easily disconnected and then reconnected without the use of tools. Another more particular object is to provide a battery cable disconnector that is less likely to be accidentally disconnected. Another more particular object is to provide a battery cable disconnector that has no parts which can be lost or misplaced.

I have invented a battery cable disconnector that enables a battery to be disconnected and reconnected quickly and easily without tools. The disconnector comprises a female lug connector and a male lug connector adapted to be detachably connected together, each of the connectors having a two-faced contact section with one face for engagement with a face of the other connector when connected. The female connector contact section has an upper contact face and a lower non-contact face, the contact section having a centrally located circular opening with slots extending radially from the opening at the 12 and 6 o'clock positions and with grooves extending radially from the opening at the 3 and 9 o'clock positions on the lower non-contact face. The male connector contact section has a lower contact face and an upper non-contact face, the contact section having a centrally located circular opening with a hex head bolt extending therethrough, the bolt having a pin extending transversely through it at a point distal from the hex head and below the lower contact face, the bolt being sized to fit through the slots in the female contact section, the bolt further having a surrounding helical spring above the upper non-contact face which yieldably urges the bolt away from the contact face. When the bolt is moved to compress the spring, the bolt and pin are insertable through the opening of the female connector contact section. And when the bolt is rotated 90 degrees and the spring is released, the pin rests in the grooves and a secure connection is made between the female and male connectors.

The battery cable disconnector enables a battery cable to be quickly and easily disconnected and then reconnected without the use of tools. The disconnector provides a very secure connection and has no parts which can be lost or misplaced.

DETAILED DESCRIPTION OF THE INVENTION

Figure 1:
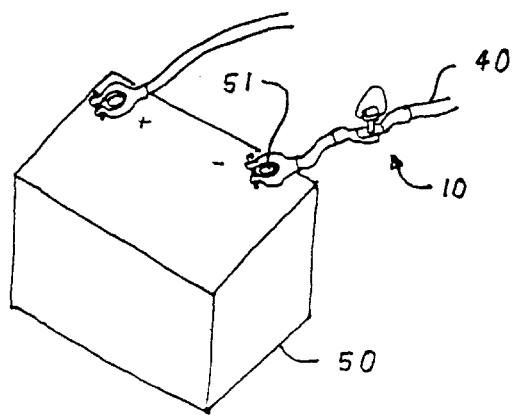
FIG. 1 is a perspective view of a conventional automobile battery with the preferred embodiment of the battery cable disconnector of this invention installed on the negative battery cable.

This invention is best understood by reference to the drawings. In FIG. 1, the preferred embodiment of the battery cable disconnector 10 of this invention is shown installed in the cable 40 running from the negative terminal 51 of an automobile battery 50. The location of the battery cable disconnector near the negative battery terminal is especially convenient for use by automobile mechanics. However, it is understood that the battery cable disconnector can be located at any desired place on the cable. Furthermore, the battery cable disconnector can be used on cables not associated with an automobile or other motorized vehicle. In other words, the disconnector is useful wherever a means for quickly and easily disconnecting and reconnecting an electrical line without the use of tools is desired.

Figure 2:
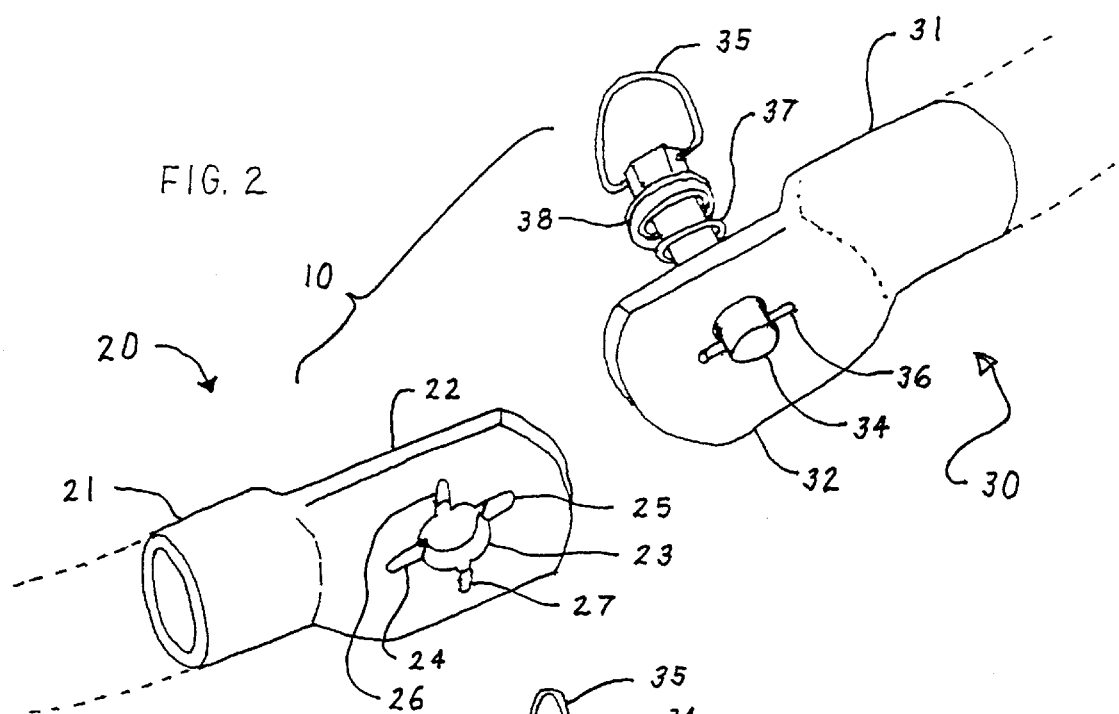
FIG. 2 is a perspective view of the disconnector in the disconnected position.
Figure 3:
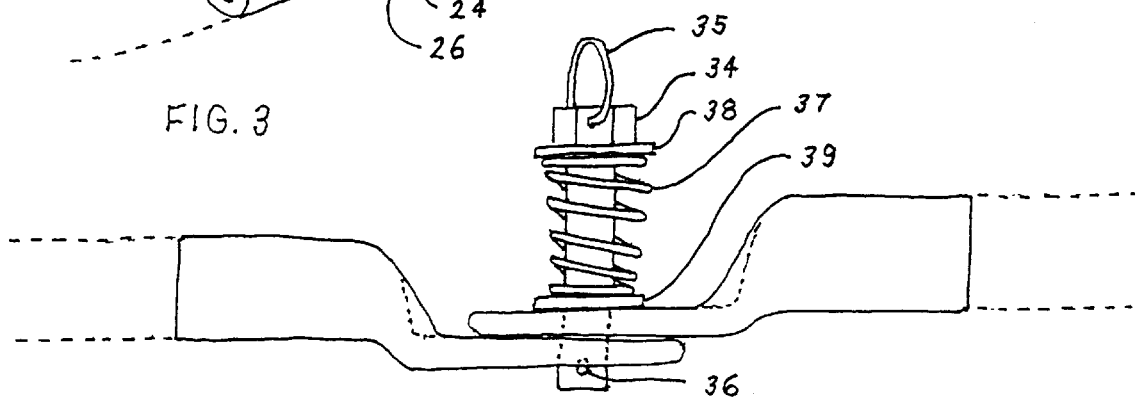
FIG. 3 is an elevation view thereof in the connected position.

Referring now to FIGS. 2 and 3, the disconnector consists of a female lug connector 20 and a male lug connector 30.

The female lug connector is made of an electrical conducting material, preferably copper. If copper is used, it is preferably tin-plated for corrosion resistance. The female lug connector contains a tubular section 21 with an outside diameter of about five-eighths inch that receives a standard battery cable. The female lug connector also contains a flat, two-faced contact section 22. The contact section contains a centrally-located circular opening 23 having a diameter of about three-eighths inch. Extending radially from the circular opening are opposing slots 24 and 25. The slots are preferably located at the 12 o'clock and 6 o'clock positions when the female lug connector is oriented with its tubular section up. The slots extend through the entire thickness of the contact section and are close-ended. Also extending radially from the circular opening are opposing grooves 26 and 27. The grooves are offset from the slots, preferably by 90 degrees to maximizes the amount of the offset. Accordingly, the grooves are preferably located at the 3 o'clock and 9 o'clock positions. The grooves are located only in the lower, non-contact face of the contact section.

The male lug connector 30 contains several parts. The first part includes a tubular section 31 and a flat, two-faced contact section 32 with a centrally-located circular opening. The first part is similar in construction to the female lug connector except there are no slots or grooves extending from the circular opening. The male lug connector also contains a hex head bolt 34 having a diameter of about three-eighths inch and a length of about one and five-eighths inches. The term "bolt" is used to describe this member despite the fact that it contains no threads. The bolt contains two transverse and parallel one-eighth inch holes, one through the hex head and one at the opposite, distal end of the bolt. A wire lever 35 is inserted into the hex head hole and held in place by spring tension. A retaining pin 36 is inserted into the distal end hole and held in place by press fit. A helical spring 37 surrounds the portion of the bolt extending above the upper non-contact face. The spring is retained by washers 38 and 39 that are wedged between the spring and, respectively, the hex head of the bolt and the upper non-contact face.

The operation of the disconnector can now be considered. To connect the disconnector, the male lug connector is positioned over the female lug connector with the hex head bolt directly over the opening in the contact section of the female lug connector. The wire lever is aligned longitudinally so that the retaining pin is aligned with the slots. Holding the female lug connector stationary, downward pressure is exerted onto the hex head bolt. The spring is compressed, the bolt moves downward, and the retaining pin passes through the slots to a position below the lower face of the female lug connector. The wire lever is then rotated to align the retaining pin with the grooves. In the preferred embodiment, the wire lever is rotated 90 degrees in either direction to align. The downward pressure on the hex head bolt is then released. The spring force provides an upward force on the retaining pin which, in turn, securely engages the contact faces of the female and male lug connectors together. The position of the retaining pin in the grooves further secures the connection.

The disconnector is disconnected in the reverse manner. Downward pressure is exerted on the hex head bolt while holding the female lug stationary. The wire lever is rotated to align the retaining pin with the slots, and then the pressure on the hex head bolt is released.

Figure 4:
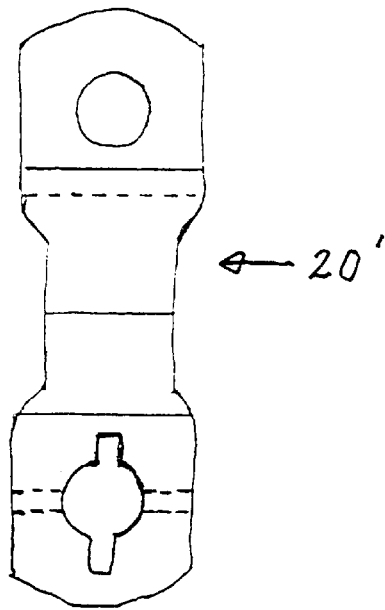
FIG. 4 is a front elevation view of an alternate embodiment of one component of the disconnector of this invention.
Figure 5:
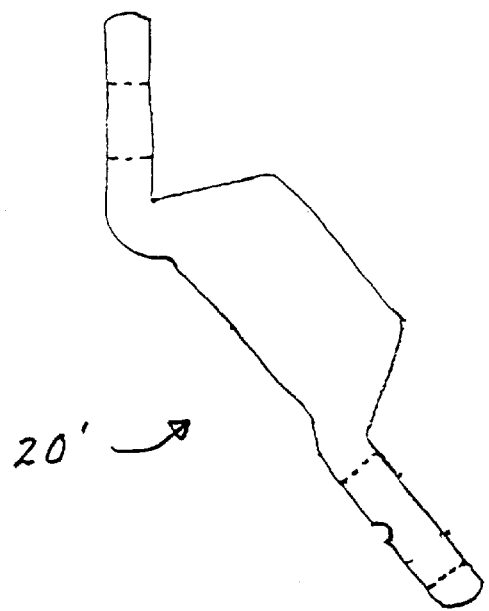
FIG. 5 is a side elevation view thereof.

An alternative embodiment is shown in FIGS. 4 and 5. Rather then being connected to a battery cable, the alternate female lug connector 20' is constructed so that it connects directly to a side-mounted battery terminal. The alternate female lug connector is angled so the contact section is more easily accessible. An analogous connector is used to connect directly to a top-mounted battery terminal.

Figure 6:
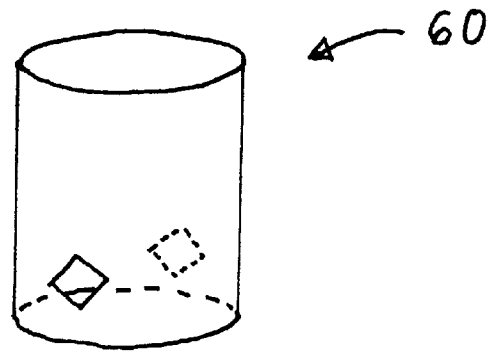
FIG. 6 is an elevation view of an optional rubber cover.
Figure 1:
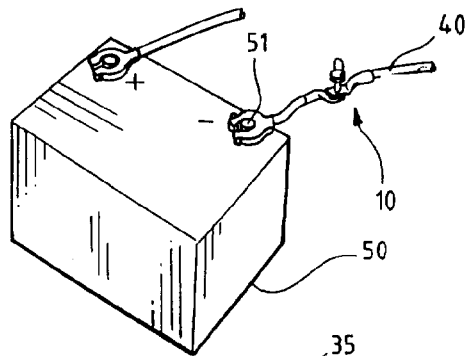
Figure 2:
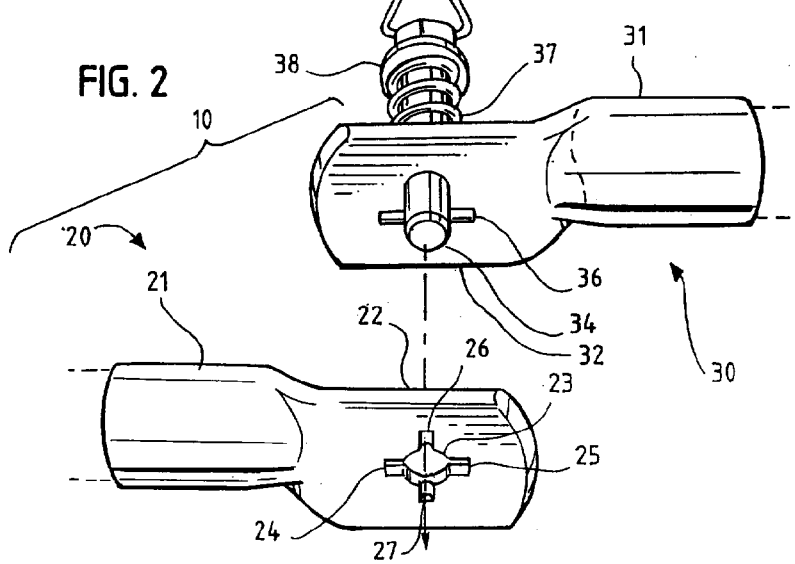
Figure 3:
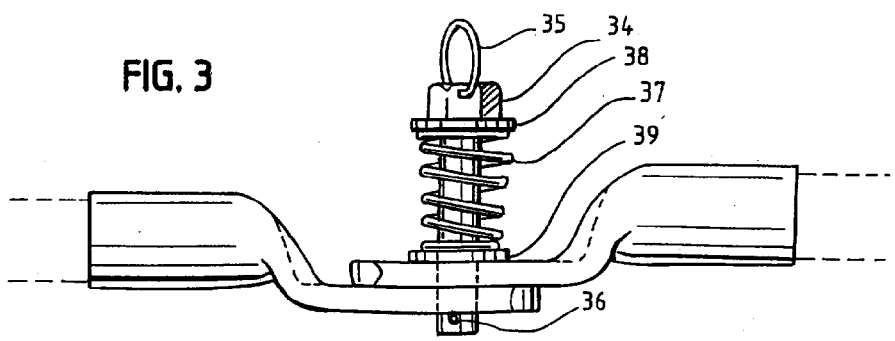
Figure 4:
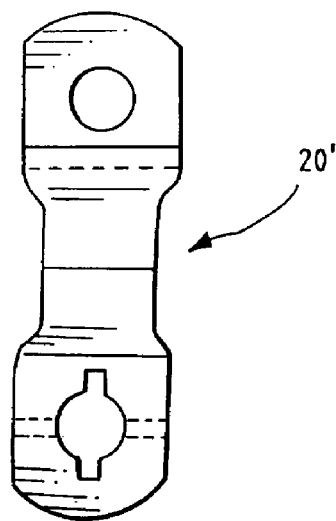
Figure 5:
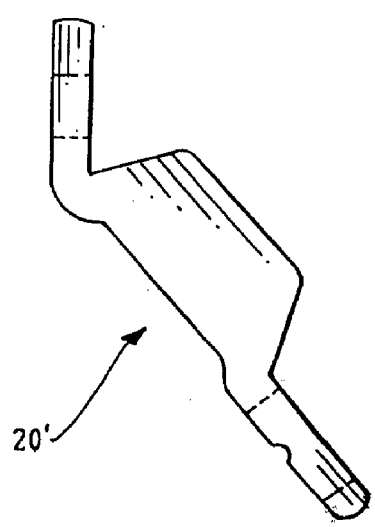
Figure 6:
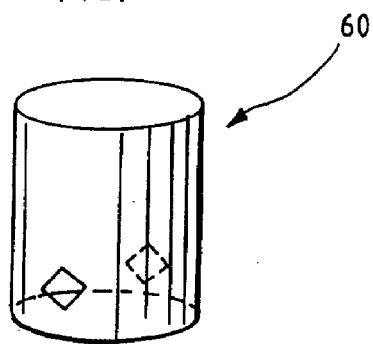

An optional component is a rubber cover 60, one embodiment of which is shown in FIG. 6. The rubber cover fits over the disconnector and helps protect the electrical contact faces from moisture and debris. A wide variety of alternative embodiments are suitable, including a rubber cylindrical sleeve that is tied at one to the end of the cable running to the battery. The sleeve protects the electrical contact faces and also helps prevent the connector from causing a short to ground by coming into contact with a metal engine component when disconnected.

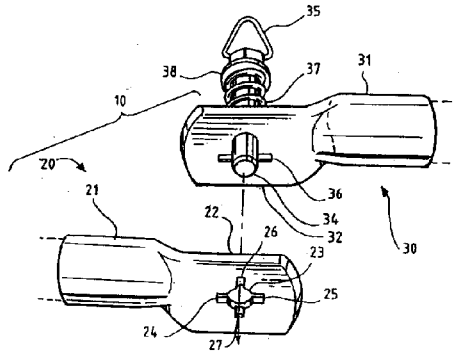

I claim:

1. A battery cable disconnector that enables a battery to be disconnected and reconnected quickly and easily without tools, the disconnector comprising a female lug connector and a male lug connector adapted to be detachably connected together, each of the connectors having a two-faced contact section with one face for engagement with a face of the other connector when connected, the female connector contact section having an upper contact face and a lower substantially flat non-contact face, the contact section having a centrally located circular opening with slots extending radially from the opening at the 12 and 6 o'clock positions and with grooves extending radially from the opening at the 3 and 9 o'clock positions on the lower non-contact face, the male connector contact section having a lower contact face and an upper non-contact face, the contact section having a centrally located circular opening with a hex head bolt extending therethrough, the bolt having a pin extending transversely through it at a point distal from the hex head and below the lower contact face, the pin being sized to fit through the slots in the female contact section, the bolt further having a surrounding helical spring above the upper non-contact face which yieldably urges the pin against the contact face, the hex head of the bolt having a means for turning the bolt by hand, such that, when the bolt is moved to compress the spring, the bolt and pin are insertable through the opening of the female connector contact section, and such that, when the bolt is rotated 90 degrees in either a clockwise or counterclockwise direction and the spring is released, the pin rests in the grooves and a secure connection is made between the female and male connectors.

2. The battery cable disconnector of claim 1 wherein the contact sections of the male connector and female connector comprise copper.

3. The battery cable disconnector of claim 2 wherein the male connector and female connector contain tubular sections for receiving a battery cable.

4. A battery cable disconnector that enables a battery to be disconnected and reconnected quickly and easily without tools, the disconnector comprising a female lug connector and a male lug connector adapted to be detachably connected together, each of the connectors having a two-faced contact section with one face for engagement with a face of the other connector when connected, the female connector contact section having an upper contact face and a lower substantially flat non-contact face, the contact section having an opening with opposing slots extending radially from the opening and with offset opposing grooves extending radially from the opening on the lower non-contact face, the male connector contact section having a lower contact face and an upper non-contact face, the contact section having an opening with a bolt extending therethrough, the bolt having a pin extending transversely through it at a distal point below the lower contact face, the pin being sized to fit through the slots in the female contact section, the bolt further having a surrounding helical spring above the upper non-contact face which yieldably urges the pin against the contact face, the bolt having a wire lever for turning the bolt by hand, such that, when the bolt is moved to compress the spring, the bolt and pin are insertable through the opening of the female connector contact section, and such that, when the bolt is rotated in either a clockwise or counterclockwise direction and the spring is released, the pin rests in the grooves and a secure connection is made between the female and male connectors.

5. A battery cable disconnector that enables a battery to be disconnected and reconnected quickly and easily without tools, the disconnector comprising a female lug connector and a male lug connector adapted to be detachably connected together, each of the connectors having a two-faced contact section with one face for engagement with a face of the other connector when connected, the female connector contact section having an upper contact face and a lower substantially flat non-contact face, the contact section having an opening with a slot extending radially from the opening and with an offset groove extending radially from the opening on the lower non-contact face, the male connector contact section having a lower contact face and an upper non-contact face, the contact section having an opening with a member extending therethrough, the member having a transverse retainer at a distal point below the lower contact face, the retainer being sized to fit through the slot in the female contact section and to rest in the groove, the member further having a spring means which yieldably urges the retainer against the contact face, the member having a wire lever for turning the bolt by hand, such that, when the member is moved to compress the spring means, the member and retainer are insertable through the opening of the female connector contact section, and such that, when the member is rotated in either a clockwise or counterclockwise direction and the spring means is released, the retainer rests in the groove and a secure connection is made between the female and male connectors.

* * * * *

UNITED STATES PATENT AND TRADEMARK OFFICE
CERTIFICATE OF CORRECTION

PATENT NO.      : 6,338,649 B1
DATED           : January 15, 2002
INVENTOR(S)     : Michael W. Smith It is certified that error appears in the above-identified patent and that said Letters Patent is hereby corrected as shown below:

<u>Title page,</u>
The Title page should be deleted and substitute therefore the attached Title page.

<u>Drawings,</u>
Delete drawing sheets 1-2, and substitute therefore the drawing sheets, consisting of Figs 1-6, as shown on the attached pages.

Signed and Sealed this

Seventh Day of January, 2003

JAMES E. ROGAN
*Director of the United States Patent and Trademark Office*

(12) United States Patent
Smith

(10) Patent No.: US 6,338,649 B1
(45) Date of Patent: Jan. 15, 2002

(54) BATTERY CABLE DISCONNECTOR

(76) Inventor: Michael W. Smith, 10190 Buckhart Rd., Rochester, IL (US) 62563

( * ) Notice: Subject to any disclaimer, the term of this patent is extended or adjusted under 35 U.S.C. 154(b) by 0 days.

(21) Appl. No.: 09/800,983

(22) Filed: Mar. 7, 2001

Related U.S. Application Data

(60) Provisional application No. 60/188,963, filed on Mar. 10, 2000.

(51) Int. Cl.[7] .................................................. H01R 11/00
(52) U.S. Cl. .................. 439/504; 439/369; 439/370; 411/552
(58) Field of Search ................................. 439/504, 345, 439/369, 370; 403/325, 348; 24/700, 701, 598.1; 411/552, 553

(56) References Cited

U.S. PATENT DOCUMENTS

| | | | |
|---|---|---|---|
| 2,238,865 A | * 4/1941 | Purinton | 24/221 |
| 2,457,593 A | 12/1948 | Nelson | 287/76 |
| 3,564,563 A | * 2/1971 | Trotter et al. | 24/221 |
| 3,605,065 A | * 9/1971 | Shannon | 339/28 R |
| 4,419,029 A | * 12/1983 | Wenzel | 403/408 |
| 4,442,571 A | * 4/1984 | Davis et al. | 411/552 |
| 4,892,491 A | 1/1990 | Budano et al. | 439/582 |
| 5,018,993 A | 5/1991 | Durham | 439/801 |
| 5,066,905 A | * 11/1991 | Betton et al. | 324/133 |
| 5,342,225 A | 8/1994 | Farr | 439/817 |
| 5,688,093 A | * 11/1997 | Bowers | 411/552 |
| 5,707,250 A | * 1/1998 | Smithson | 439/504 |

OTHER PUBLICATIONS

"Brass Battery Switch With Removable Knob" featured in the order–form insert of the Mid–Winter 2001 Herrington Catalog, 2001.

* cited by examiner

*Primary Examiner*—Tho D. Ta
*Assistant Examiner*—Ann McCamey
(74) *Attorney, Agent, or Firm*—Philip L. Bateman

(57) ABSTRACT

A battery cable disconnector enables a battery to be disconnected and reconnected quickly and easily without tools. The disconnector includes a female lug connector and a male lug connector adapted to be detachably connected together, each of the connectors having a two-faced contact section with one face for engagement with a face of the other connector when connected. The female contact section has an upper contact face and a lower non-contact face, the contact section having a centrally located circular opening with slots extending radially from the opening at the 12 and 6 o'clock positions and with grooves extending radially from the opening at the 3 and 9 o'clock positions on the lower non-contact face. The male connector contact section has a lower contact face and an upper non-contact face, the contact section having a centrally located circular opening with a hex head bolt extending therethrough, the bolt having a pin extending transversely through it at a point distal from the hex head and below the lower contact face, the pin being sized to fit through the slots in the female contact section, the bolt further having a surrounding helical spring above the upper non-contact face which yieldably urges the bolt away from the contact face.

5 Claims, 2 Drawing Sheets